United States Patent [19]

Osgood

[11] Patent Number: 5,751,397
[45] Date of Patent: May 12, 1998

[54] COLOR MOTION DEPTH EFFECT SYSTEM

[76] Inventor: Alan G. Osgood, 16725 NE. 98th Pl., Redmond, Wash. 98052

[21] Appl. No.: 483,564
[22] Filed: Jun. 6, 1995
[51] Int. Cl.$^6$ .................................. G03B 21/32
[52] U.S. Cl. .................................. 352/86; 352/43
[58] Field of Search .................. 352/43, 57, 86; 359/478; 353/10

[56] References Cited

U.S. PATENT DOCUMENTS

| | | |
|---|---|---|
| 1,498,743 | 6/1924 | Macy . |
| 1,548,262 | 8/1925 | Freedman . |
| 1,745,107 | 1/1930 | Mendoza . |
| 3,445,153 | 5/1969 | Marks ................... 350/144 |
| 3,621,127 | 11/1971 | Hope .................... 178/6.5 |
| 4,131,342 | 12/1978 | Dudley .................. 352/43 |
| 4,134,644 | 1/1979 | Marks ................... 350/132 |
| 4,705,371 | 11/1987 | Beard ................... 352/86 |
| 4,836,647 | 6/1989 | Beard ................... 350/132 |
| 4,893,898 | 1/1990 | Beard ................... 350/132 |
| 4,925,294 | 5/1990 | Geshwind et al. ....... 352/57 |
| 4,934,824 | 6/1990 | Ling .................... 352/57 |
| 5,243,460 | 9/1993 | Kornberg ............... 359/464 |

FOREIGN PATENT DOCUMENTS

| | | |
|---|---|---|
| 3343781 | 6/1985 | Germany ............ G02B 27/22 |
| 3428038 | 8/1985 | Germany ............ G02B 27/22 |

Primary Examiner—Safet Metjahic
Assistant Examiner—John Chizmar

[57] ABSTRACT

A method for creating the perception of visual depth in two dimensional displays. A filter or lens of one color (for example red) covers the left eye of a viewer and a lens of another color (for example green) covers the right eye. Objects moving in either lateral direction can be made to appear closer to or farther away from the viewer depending upon the color of the objects and surrounds. Objects that appear brighter to the left eye appear closer to the viewer when they are moving from left to right. These left eye bright objects appear farther away from the viewer when they are moving from right to left. The effect is reversed for objects that appear brighter to the right eye. Objects that appear brighter to the right eye appear closer to the viewer when they are moving from right to left. These right eye bright objects appear farther away from the viewer when they are moving from left to right. The colors of the areas surrounding moving objects can produce or contribute to the depth effect. The amount of perceived depth is affected by the eye to eye brightness ratios of the objects and surrounds. More saturated colors, which produce higher eye to eye brightness ratios tend to produce larger effects. The strength of the depth effect is also affected by the rate of lateral movement in terms of visual angle. Faster moving objects produce a larger effect than slower moving objects.

25 Claims, 7 Drawing Sheets

Different Colored Objects with Brightness Neutral Surround

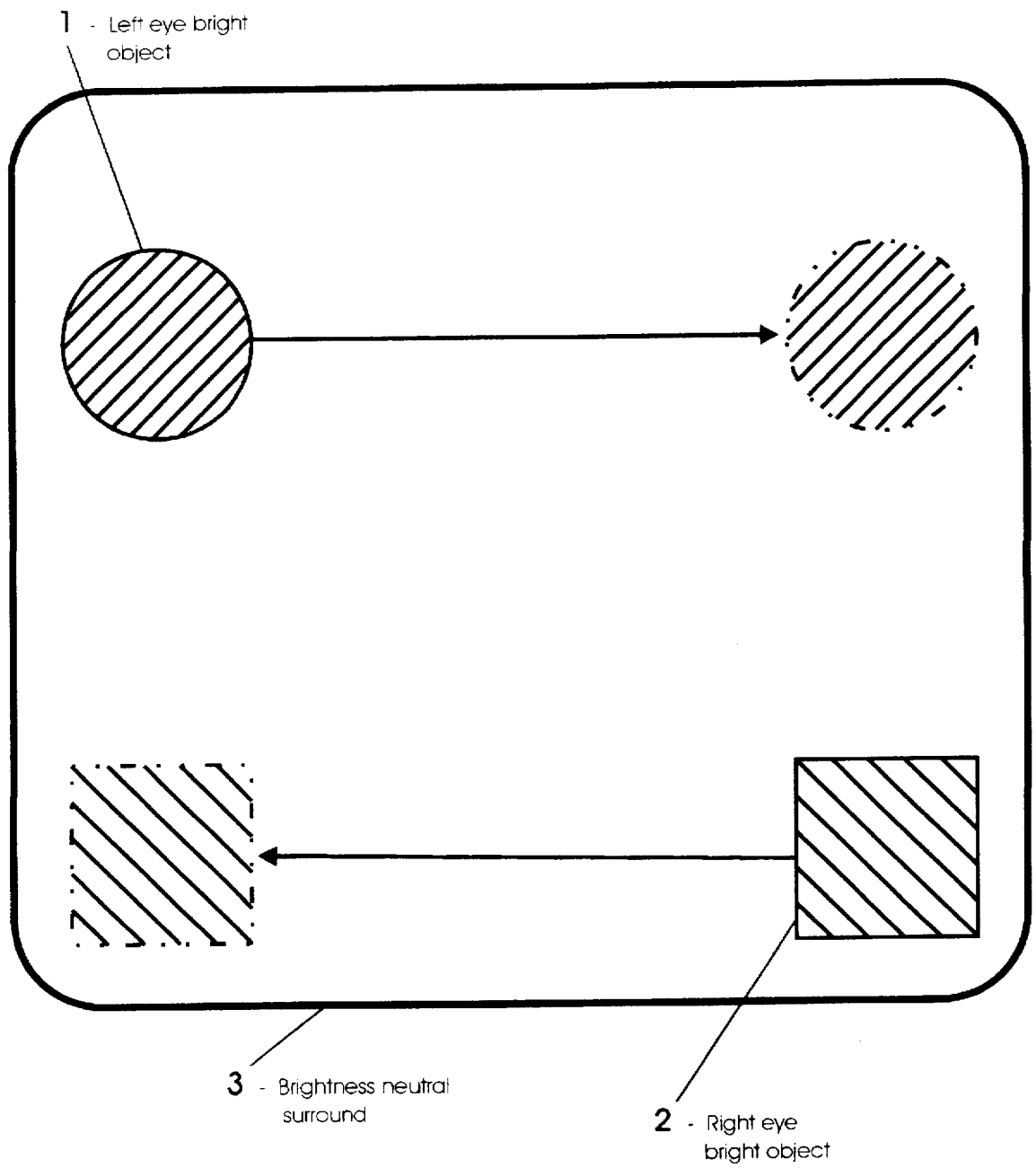
Fig. 1 - Different Colored Objects with Brightness Neutral Surround

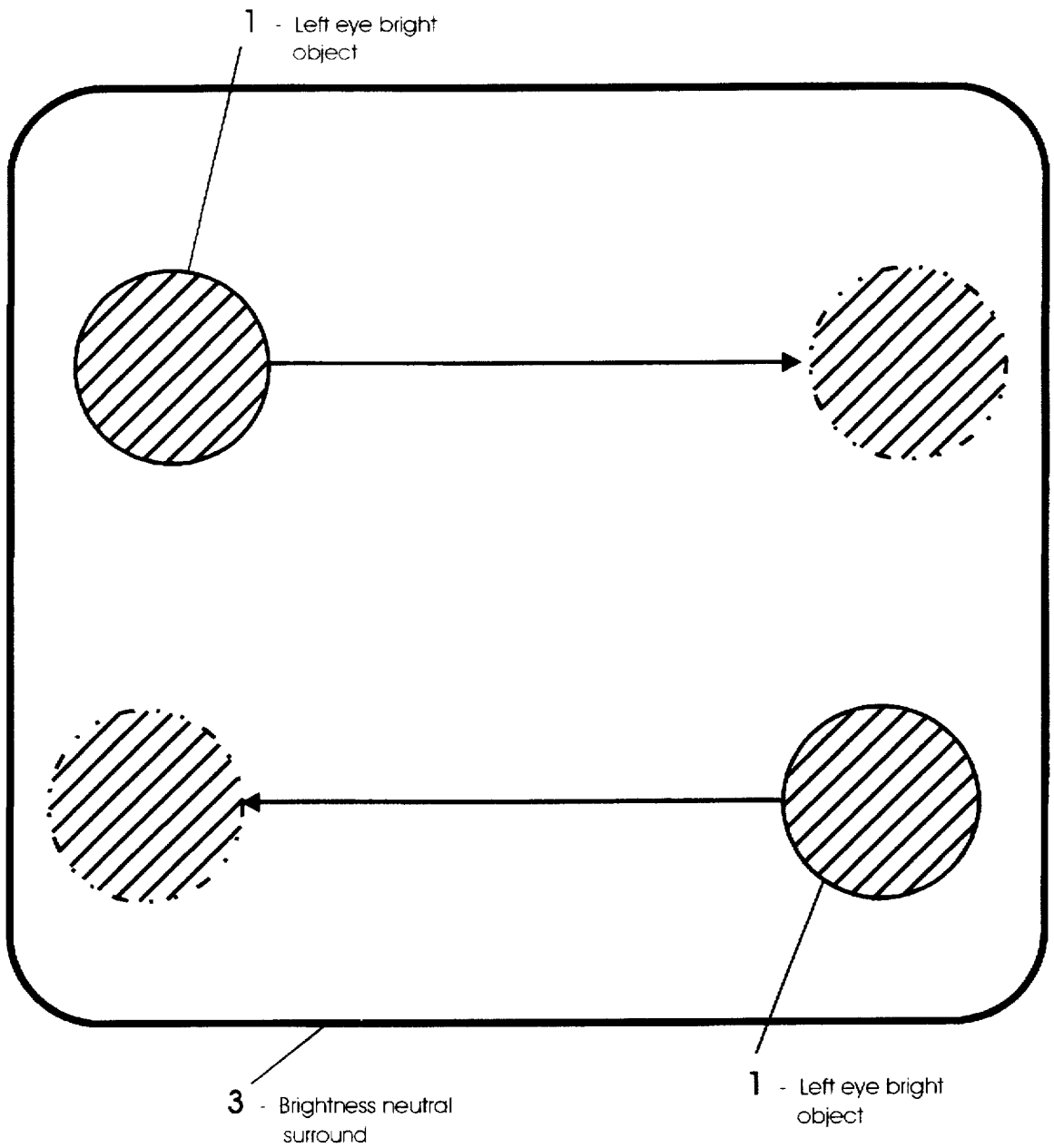
Fig 2 - Same Colored Objects Moving in Opposite Directions

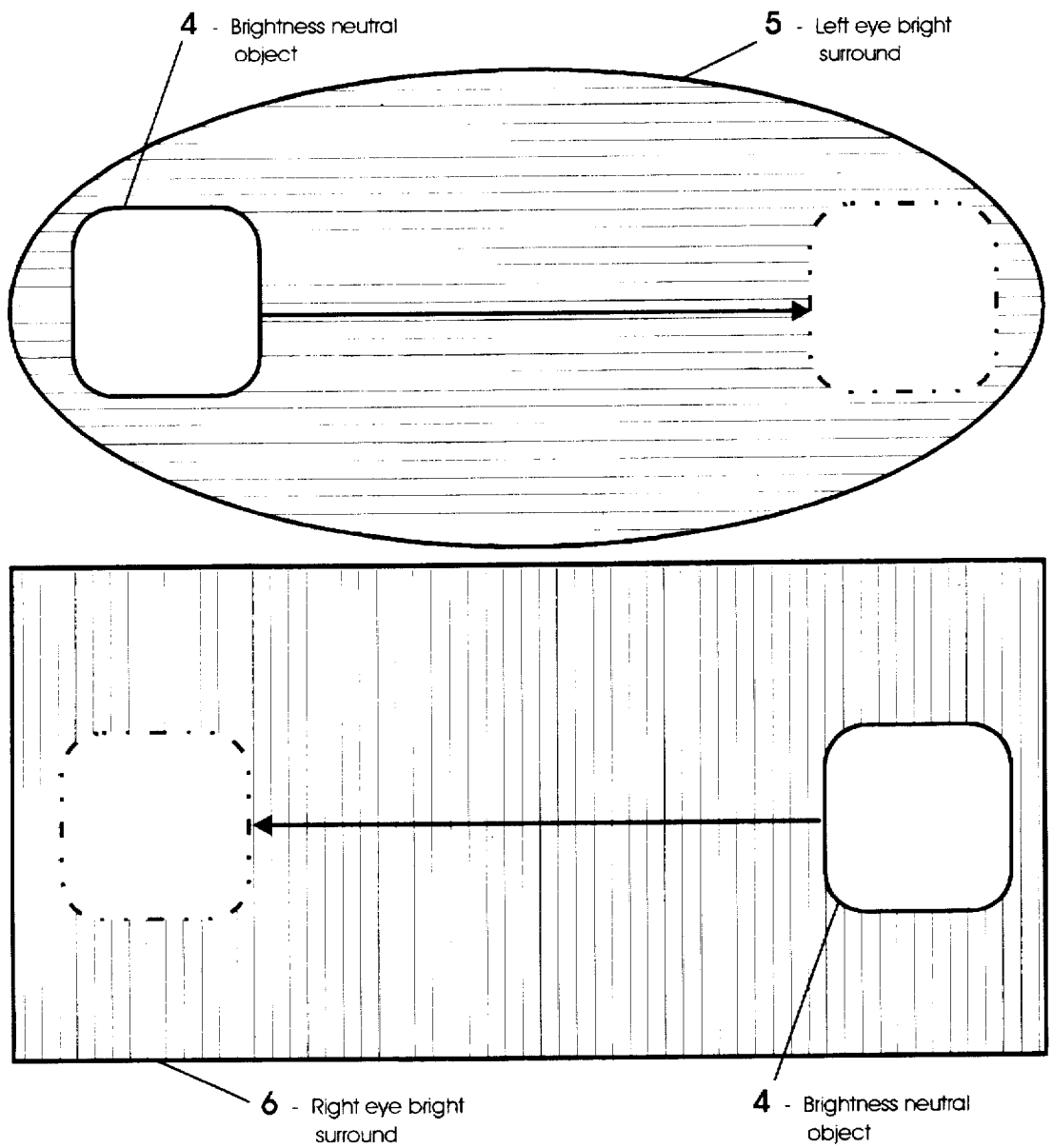
Fig. 3 - Brightness Neutral Objects with Different Colored Surrounds

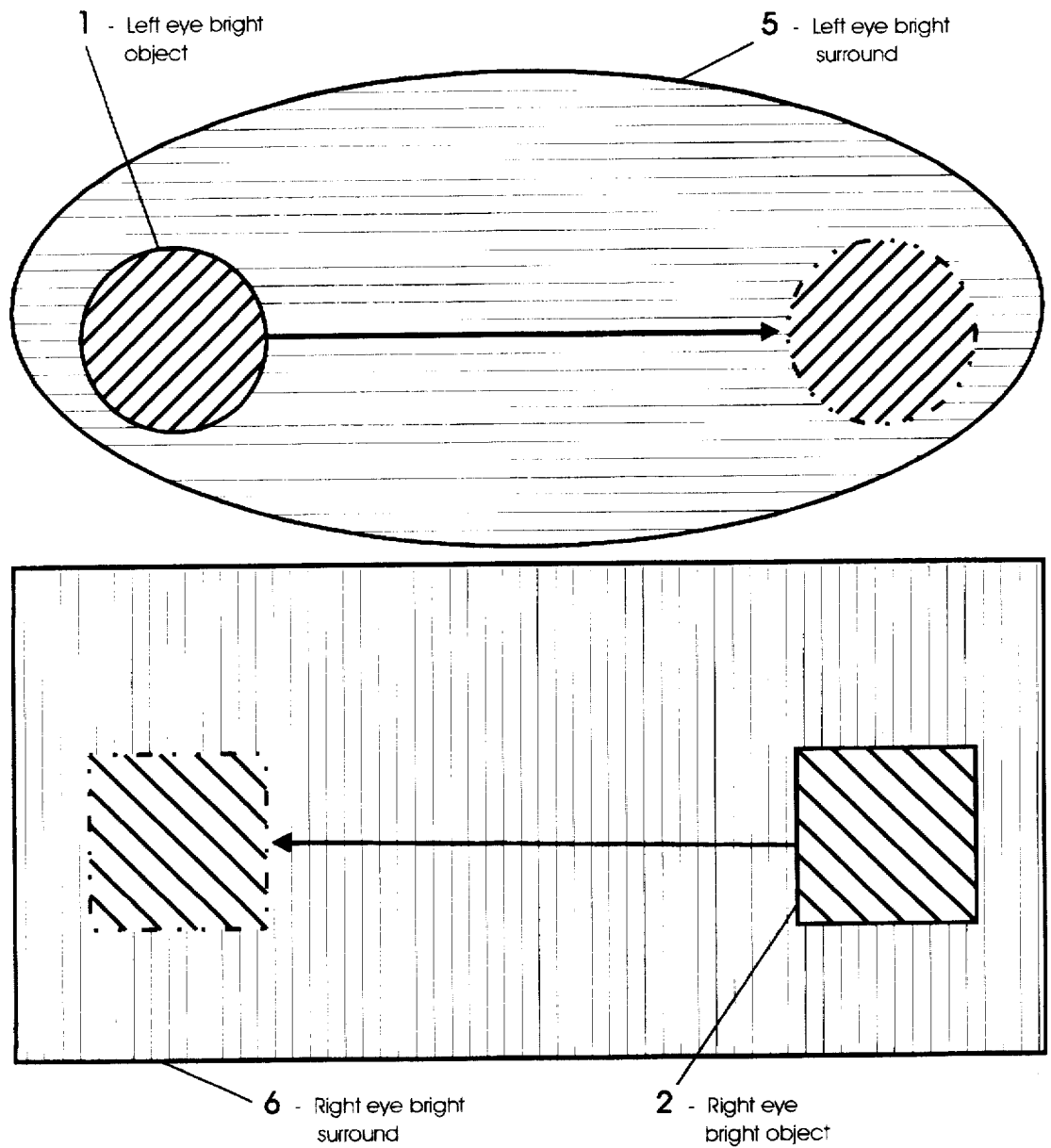
Fig. 4 - Colored Objects with Same Eye Bright Surrounds

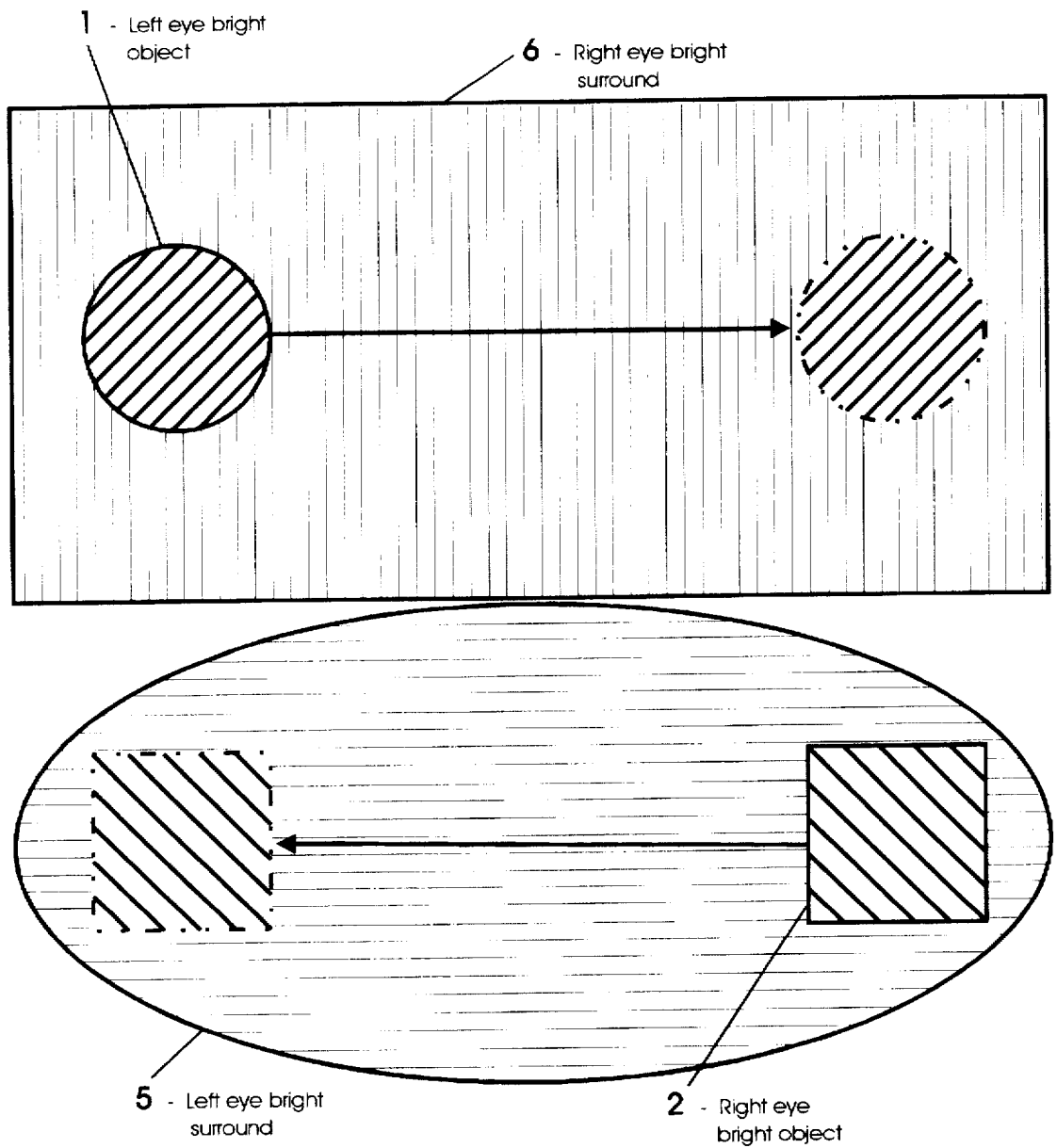
Fig. 5 - Colored objects with Opposite Eye Bright Surrounds

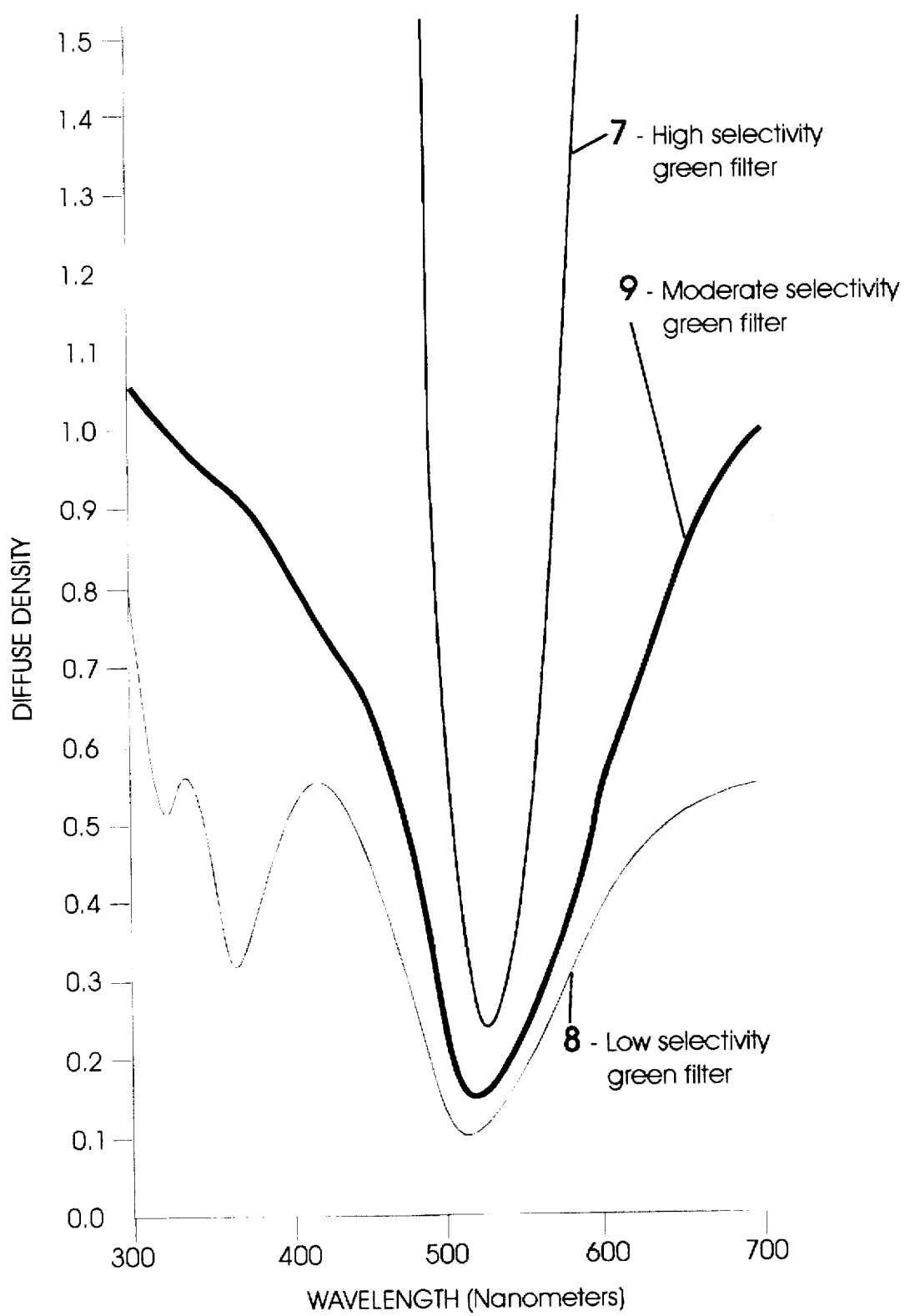
Fig. 6 - Sample Green Filter Curves

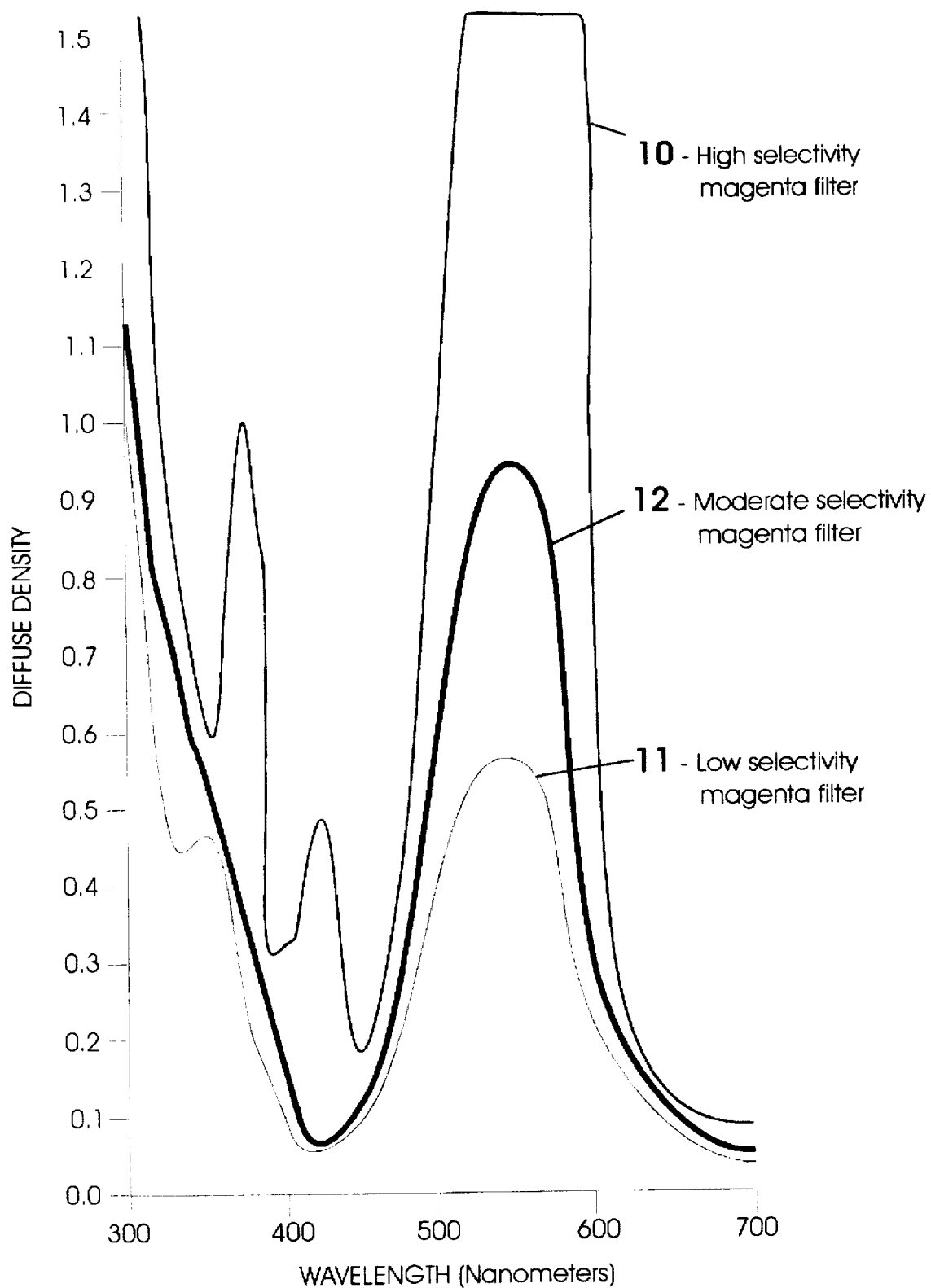
Fig. 7 - Representative Magenta Filter Curves

COLOR MOTION DEPTH EFFECT SYSTEM

BACKGROUND

1. The Field of the Invention

The present invention relates to a method for using filters or lenses of different colors to create the perception of depth when viewing moving objects.

In a further aspect, the present invention relates to the color selectivity of filters used to produce the depth effect.

In a still further aspect, the present invention relates to a method of controlling the color and movement of objects to create a visual depth effect when viewers wear colored lenses. The invention also relates to the colors of areas surrounding moving objects that also produce the depth perception effect.

The system is suited for single image video displays (television, computer displays, video games, etc.), motion picture films, and other types of media.

2. The Prior Art

The prior art includes methods to create the perception of depth in two-dimensional motion picture films and video displays. These methods have been described in or have been the subject of various patents. The prior art often produces one or more of the following three negative side effects:

(1) Reduction or loss of perception of color, (2) Unstable images due to retinal brightness disparity (objects appeared substantially brighter to one eye than the other), and (3) Dead eye effect wherein viewers have the sensation that one eye is not functioning properly.

Prior art systems generally use two separate shifted images of different polarization or color to produce visual depth effects. These systems use eye wear that transmits one image to one eye and the other image to the other eye. Difference in the relative position of objects as seen by the two eyes produces the perception of depth.

U.S. Pat. No. 1,498,743 to Macy discloses using eye pieces of different colors to produce the perception of depth when viewing pictures with colored double images. One image, which has elements shifted to the left, is the same color as the lens covering the left eye. The other image, which has elements shifted to right, is the same color as the lens covering the right eye. The strength of the depth effect is controlled by the relative amount of shift between the two images. Portions of images (objects) that are shifted more appear to be closer than portions that are not shifted as much. The lenses disclosed in U.S. Pat. No. 1,498,743 are highly color selective. The preferred lens for one eye transmits also all red light and blocks almost all green light. The lens for the other eye transmits almost all green light and blocks almost all red light. The image seen by each eye is composed of only a narrow range of color. Therefore viewers have very little, if any, perception of color. This lack of color perception has limited viewer acceptance and commercial viability.

Freedman discloses the manufacture of two colored eye pieces in U.S. Pat. No. 1,548,262. This method has the same problem with lack of perceived color as the method of U.S. Pat. No. 1,498,743 above.

U.S. Pat. No. 1,745,107 to Mendoza discloses a system of using rapidly moving red and green screens along with eye pieces having red and green lens to produce the perception of depth in moving pictures. An observer wears an eye piece with one red and one green lens. The red and green screens are moved rapidly in the projection beam of a movie projector. This method also has the problem with lack of perceived color.

Marks discloses a system with a stereoscopic camera along with green and magenta (red and blue) eye pieces in U.S. Pat. No. 4,134,644. Particular green and magenta filters were used to allow the perception of color. The perception of color was limited due to interocular suppression with saturated colors.

Another method of creating visual depth effects is based on the Pulfrich Effect. This effect is produced by viewing moving objects with a dark lens or filter over one eye. Objects that move laterally in one direction appear to be farther away from the observer. Conversely, objects that move laterally in the opposite direction appear to be closer to the observer. The Pulfrich effect is a unidirectional motion sensitive depth effect. The relationship between the direction of movement and the perception of depth is dependent upon which eye is covered by the dark lens. When the left eye is covered by the dark lens, objects moving left to right (from the viewer's perspective) appear to be farther away. Objects moving right to left appear to be closer. When the right eye is covered by the dark lens, objects moving left to right appear to be closer. Objects moving right to left appear to be farther away.

The apparatus used to produce the Pulfrich effect tends to cause an undesirable side effect. The eye covered by the dark lens receives substantially less light than the other eye. This produces the sensation that one eye is dead or not working. This dead eye effect becomes irritating to viewers over time.

U.S. Pat. No. 3,445,153 to Marks is based on the Pulfrich effect. Viewers wear special lenses. The lens over one eye reduces the light normally received by the cones (photopic vision).

Dudley discloses in U.S. Pat. No. 4,131,342 a method of combining the Pulfrich effect with a chromostereoscopic effect. The chromostereoscopic effect is based on the finding that objects of colors towards the red end of the visual spectrum appear closer than objects of colors towards the blue end of the spectrum. The chromostereoscopic effect is very weak. It also restricts the use of colors in objects and backgrounds.

U.S. Pat. No. 4,705,371 to Beard is also based on the Pulfrich effect. Viewers wear another type of special lenses. The lenses are intended to reduce the dead eye effect.

U.S. Pat. No. 4,836,647 to Beard discloses alternative colored filters to produce the Pulfrich effect. The colored lenses were designed to reduce the light from television displays more than the light from normal room lighting. The colored lenses were intended to reduce the "dead eye" effect.

The four methods above (U.S. Pat. Nos. 3,445,153; 4,131,342; 4,705,371; and 4,836,647) are all limited by the unidirectional nature of the motion sensitive depth effect. They are all also somewhat prone to the dead eye effect.

Kornberg discloses a system for using eye pieces with red and green lenses to view conventional video images in U.S. Pat. No. 5,243,460. The red and green lenses are of different levels of color selectivity. The red lens is a high color selectivity filter. It transmits almost all red light and blocks almost all green and blue light. The green lens is a low color selectivity filter. It attenuates red light only slightly more than green light. The lenses were claimed to produce the perception of depth while viewing standard television. Kornberg made no claim as to the color and motion of the video images and the perception of depth. The depth effects produced by the colored eye pieces are due to the Pulfrich effect and are therefore dependent upon the color and movement of images. Color and motion of images in standard television media are highly variable. Depth effects produced by colored eye pieces may enhance or degrade effects produced by other depth cues such as size, interposition, brightness, clarity, etc. The method of U.S. Pat. No. 5,243,460 does not reliably produce consistent depth effects.

German Patent Document No. DT 3343-781 to Gronenborn discloses prisms and eye pieces with red and green lens for creating a depth effect with a normal television image. German Patent Document No. DT 3428-038 is similar to DT 3343-781 except one lens in the eye piece cuts off the red end of the visual spectrum and the other lens cuts off the green end. These methods, like U.S. Pat. No. 5,243,460, do not produce consistent depth effects.

BRIEF SUMMARY AND OBJECTS OF THE INVENTION

The present invention relates to a method of controlling the color and movement of objects and surrounding areas in a way that produces systematic bidirectional visual depth effects. The invention also relates to the color selectivity of filters that cover the eyes to produce the depth effect.

An object of the present invention is to define a method of using colored moving objects and their surrounds, along with colored filters that cover the eyes, to create depth effects.

A further object of the present invention is to create the same perception of visual depth (that is nearer to viewer) in objects moving in different directions.

Another object of the present invention is to create different perceptions of visual depth (for example nearer to viewer versus farther away from viewer) in objects moving in the same direction A further object of the present invention is to provide colored filters for eyes that produce a perception of depth in moving objects.

A still further object of the present invention is to provide colored filters for the eyes that eliminate, reduce or control side effects including:

(1) Reduction or loss of perception of color,
(2) Unstable images due to retinal brightness disparity (objects appear brighter to one eye than the other), and
(3) Dead eye effect wherein viewers have the sensation that one eye is not functioning properly.

The system is suited for video displays (television, computer displays, video games, etc.), motion picture films, and other types of media. The system may also be used for actual figures or live characters.

BRIEF DESCRIPTION OF THE FIGURES

FIGS. 1 through 5 are illustrations of moving objects and surrounds of different apparent brightness to the left and right eyes. The objects and surrounds in FIGS. 1 through 5 are shown as simple geometric shapes with different hatching patterns. These simple shapes and hatching patterns were chosen for purposes of illustration. The color motion depth effects are not dependent upon the geometric shapes of the objects and surrounds.

FIG. 1 shows two objects moving laterally with a brightness neutral surround. The small circle, hatched with diagonal hatching lines running from lower left to upper right, 1 represents a left eye bright object. It is a color that appears brighter to the left eye than the right eye. The left eye bright object 1 is shown moving laterally from left to right from the viewer's perspective.

The small square, hatched with diagonal hatching lines running from lower right to upper left, 2 represents a right eye bright object. It is a color that appears brighter to the right eye than the left eye. The right eye bright object 2 is shown moving laterally from right to left.

The large square with rounded corners 3 is a brightness neutral surround (it is a color that appears to be approximately the same brightness to both eyes). The surround 3 provides a visual background for the moving objects 1 and 2.

FIG. 2 shows two left eye bright objects 1 and 1. The object 1 in the upper part of FIG. 2 is moving from left to right. The object 1 in the lower part of FIG. 2 is moving from right to left. A brightness neutral surround 3 provides a visual background for both moving objects.

FIG. 3 shows two small squares with rounded corners 4 and 4. These squares with rounded corners represent brightness neutral objects. The large oval, hatched with horizontal hatching lines, 5 represents a left eye bright surround. The left eye bright surround 5 provides a visual background for the brightness neutral object 4 moving from left to right in the upper part of FIG. 3.

The large rectangle, hatched with vertical hatching lines, 6 in FIG. 3 represents a right eye bright surround. The right eye bright surround 6 provides a visual background for the brightness neutral object 4 moving from right to left in the lower part of FIG. 3.

FIG. 4 shows a left eye bright object 1 moving from left to right with a left bright surround 5. FIG. 4 also shows a right eye bright object 2 moving from right to left with a right bright surround 6.

FIG. 5 shows a left eye bright object 1 moving from left to right with a right eye bright surround 6. FIG. 5 also shows a right eye bright object 2 moving from right to left with a left eye bright surround 5.

FIGS. 6 and 7 are graphs of colored filters with different levels of diffuse densities for selected wavelengths of light.

FIG. 6 shows three green filters that attenuate red and blue light. The high selectivity green filter 7 represents filters that block or attenuate red and blue light at least 20 times more than they attenuate green light. The low selectivity green filter 8 represents filters that block or attenuate red and blue light up to four times as much as they attenuate green light. The moderate selectivity green filter 9 represents filters that attenuate red and blue light at least four times, but not more than 20 times, as much as they attenuate green light.

FIG. 7 shows three magenta filters that attenuate green light. The high selectivity magenta filter 10 represents filters that attenuate green light at least 20 times more than they attenuate red or blue light. The low selectivity magenta filter 11 represents filters that attenuate green light up to four times as much as they attenuate red or blue light. The moderate selectivity magenta filter 12 represents filters that attenuate green light at least four times, but not more than 20 times, as much as they attenuate red or blue light.

REFERENCE NUMERALS IN FIGURES

1—Left eye bright object represented by small a circle hatched with diagonal hatching lines running from lower left to upper right. A left eye bright object appears brighter to the left eye than the right eye.

2—Right eye bright represented by a small square hatched with diagonal hatching lines running from lower right to upper left. A right eye bright object appears brighter to the right eye than the left eye.

3—Brightness neutral surround represented by a large square with rounded corners. A brightness neutral surround appears approximately the same brightness to both eyes. A surround provides a background for moving objects.

4—Brightness neutral object represented by a small square with rounded corners

5—Left eye bright surround represented by a large oval hatched with horizontal hatching lines.

6—Right eye bright surround represented by a large rectangle hatched with vertical hatching lines.

7—High selectivity green filter (filter that passes at least 20 times as much green light as red or blue light).

8—Low selectivity green filter (filter that passes up to four times as much green light as red or blue light).

9—Moderate selectivity green filter (filter that passes at least four times, but no more than 20 times, as much green light as red or blue light).

10—High selectivity magenta filter (filter that passes at least 20 times as much red and blue light as green light).

11—Low selectivity magenta filter (filter that passes up to four times as much red and blue light as green light).

12—Moderate selectivity magenta filter (filter that passes at least four times, but no more than 20 times, as much red and blue light as green light).

DETAILED DESCRIPTION OF THE PREFERRED EMBODIMENTS

Summary of Invention

The present invention utilizes a visual effect newly discovered by the present inventor. This effect builds on the principle called the Pulfrich effect. The Pulfrich effect is produced by placing a dark lens over one eye so that visual images appear brighter to one eye than the other. This affects the apparent depth of laterally moving objects. The Pulfrich effect is a uni-directional motion sensitive depth effect. All objects moving in one lateral direction appear to be closer to the viewer and all objects moving in the opposite direction appear to be farther away from the viewer. For example all objects moving left to right appear to be closer to the viewer. All objects moving from right to left appear to be farther away from the viewer.

The present invention will be referred to as a color motion depth effect system or as a bi-directional motion sensitive depth effect. An object of the color motion depth effect system is to create a bidirectional Pulfrich-like depth effect. This bidirectional depth effect is produced by making some moving objects appear brighter to the left eye and making other moving objects appear brighter to the right eye. The bi-directional depth effect is also produced by having areas surrounding moving objects appear brighter to the left eye or to the right eye.

The color motion depth effect uses a different colored viewing lens for the left eye than for the right eye to produce the bi-directional depth effect. Objects and surrounds of some colors appear brighter to the left eye. Objects and surrounds or other colors appear brighter to the right eye. For example the left eye may be covered with a red filter that attenuates green light, and the right eye may be covered with a green filter that attenuates red light. Red objects and surrounds will appear brighter to the left eye. Green objects and surrounds will appear brighter to the right eye. In this document objects and surrounds that appear brighter to the left eye than to the right eye are called left eye bright objects and surrounds. Conversely, objects and surrounds that appear brighter to the right eye than to the left eye are called right eye bright objects and surrounds. Objects and surrounds that appear approximately equally bright to both eyes are called brightness neutral objects and surrounds.

Left eye bright (for example red) objects moving from left to right (from the viewer's perspective) appear to be closer to a viewer. In contrast, right eye bright (for example green) objects moving from left to right appear to be farther away from a viewer.

The color motion depth effect system is a controllable bi-direction effect in that different objects moving in the same lateral direction may appear to be closer to the viewer or farther away depending upon:

(1) the color of each object, (2) the color of the areas surrounding each object, (3) the colors of the filters covering the left and right eyes when the objects and surrounds are viewed, and (4) the direction of lateral movement.

The strength of the depth effect is affected by (1) color selectivity of the viewing filters, (2) the saturation of the colors of moving objects, (3) the saturation of the colors of the areas surrounding moving objects, and (4) the rate of lateral movement in terms of visual angle.

The prior art often produces side effects including the following:

(1) reduction or loss of perception of color, (2) unstable images due to retinal brightness disparity (objects appear brighter to one eye than the other), and (3) dead eye effect wherein viewers have the sensation that one eye is not functioning properly.

The present invention eliminates, reduces or controls each of these side effects.

DETAILED DESCRIPTION OF INVENTION

Reference is now made to the drawings wherein like parts are designated with like numerals throughout.

Basic Color Motion Depth Effect. The following combinations of image and filter colors are used to explain the method and phenomenon used in the color motion depth effect system. The filter for the left eye is magenta (transmits red and blue light and attenuates green light). The filter for the right eye is cyan (transmits green and blue light and attenuates red light). Red objects and surrounds appear brighter to the left eye (left eye bright). Green objects and surrounds appear brighter to the right eye (right eye bright). Certain blue, white, gray, black or yellow (red plus green) objects and surrounds are brightness neutral (they appear to be approximately the same brightness to both eyes). Other combinations of colors may also be used to produce the color motion depth effect as explained below.

FIG. 1 is an illustration of the effect of lateral movement of different colored objects seen by a viewer wearing colored glasses constructed in accordance with the invention. The small circle 1 in the upper part of FIG. 1 represents a left eye bright object 1. In this example a red object is left eye bright since it appears brighter to the left eye than the right eye. This left eye bright object is shown moving from left to right (from the viewer's perspective). The small square 2 in the lower part of FIG. 1 represents a right eye bright object. In this example a green object is right eye bright since it appears brighter to the right eye than the left eye. The right eye bright object is moving from right to left.

The two moving objects (1 and 2) are surrounded by a large square with round corners 3. This large square with rounded corners represents a brightness neutral surround. In this example a gray surround is brightness neutral since it appears approximately the same brightness to both eyes. Both the left eye bright object 1 moving from left to right and the right eye bright object 2 moving from right to left appear closer to the viewer than the brightness neutral surround 3.

FIG. 2 is an illustration of the effect of lateral movement in opposite directions of colored objects seen by a viewer wearing colored glasses constructed in accordance with the invention. Two left eye bright (for example red) objects 1 and 1 are moving in opposite lateral directions. In the upper part of FIG. 2 a left eye bright object 1 is moving from left to right. This left eye bright object appears to be closer to the viewer than the brightness neutral (for example gray) surround 3. In the lower part of FIG. 2 a left eye bright object 1 is moving from right to left. This left eye bright object appears to be farther away from the viewer than the brightness neutral surround 3.

FIG. 3 is an illustration of the effect of lateral movement of brightness neutral objects with colored surrounds seen by a viewer wearing colored glasses constructed in accordance with the invention. The small square with rounded corners 4 in the upper part of FIG. 3 represents a brightness neutral (for example gray) object. The large oval 5 in the upper part of FIG. 3 represents a left eye bright (for example red) surround. The brightness neutral object 4 is moving from left to right within the left eye bright surround 5. This brightness neutral object 4 appears closer to the viewer than its left eye bright surround 5.

The large square 6 in the lower part of FIG. 3 represents a right eye bright (for example green) surround. A brightness neutral object 4 is moving from right to left within the right eye bright surround 6. This brightness neutral object 4 appears closer to the viewer than its right eye bright surround 6.

FIG. 4 is an illustration of the effect of lateral movement of different colored objects with similar colored surrounds seen by a viewer wearing colored glasses constructed in accordance with the invention. In the upper part of FIG. 4 a left eye bright object 1 with a left eye bright surround 5 is moving from left to right. The object and its surround may vary in color saturation. For example the object may be relatively unsaturated (for example pink) and its surround may be relatively saturated (for example bright red). Both the object 1 and its surround 5 appear brighter to the left eye than the right eye. The effects of the relative eye to eye brightness ratios of the moving object and its surround complement each other. The moving left eye bright object 1 appears closer to the viewer than its left eye bright surround 5. Conversely, the object may be relatively saturated (for example bright red) and its surround may be relatively unsaturated (for example pink). Both the object 1 and its surround 5 appear brighter to the left eye than the right eye. The effects of the relative eye to eye brightness ratios of the moving object and its surround complement each other. The moving left eye bright object 1 appears closer to the viewer than its left eye bright surround 5.

In the lower part of FIG. 4 a right eye bright object 2 with a right eye bright surround 6 is moving from right to left. Both the object 2 and its surround 6 appear brighter to the right eye than the left eye. The object and its surround may vary in overall brightness. For example the object may be lighter (for example light green) and its surround may be darker (for example dark green). The effects of the relative eye to eye brightness ratios of the moving object and its surround complement each other. The moving right eye bright object 2 appears closer to the viewer than its right eye bright surround 6. Conversely the the object may be darker (for example dark green) and its surround may be lighter (for example light green). The effects of the relative eye to eye brightness ratios of the moving object and its surround complement each other. This moving right eye bright object 2 appears closer to the viewer than its right eye bright surround 6.

FIG. 5 is an illustration of the effect of lateral movement of colored objects with different colored surrounds seen by a viewer wearing colored glasses constructed in accordance with the invention. In the upper part of FIG. 5 a left eye bright object 1 is moving from left to right with a right eye bright surround 6. The object 1 appears brighter to the left eye. However, the surround 6 appears brighter to the right eye. The depth effects of the relative eye to eye brightness ratios of the object and its surround are antagonistic to each other. The object may appear to be closer to, or farther away from, its surround. The depth effects tend to be unstable: the apparent depth of the object 1 may switch between appearing closer to, farther away from, or the same distance as its surround 6.

In the lower part of FIG. 5 a right eye bright object 2 is moving from right to left with a left eye bright surround 5. The object 2 appears brighter to the right eye. However, the surround 5 appears brighter to the left eye. Again the depth effects of the relative eye to eye brightness ratios of the object and its surround are antagonistic to each other. The object may appear to be closer to, the same distance as, or farther away from, its surround. The depth effects tend to be unstable: the apparent depth of the object 2 may switch between appearing closer to, farther away from, or the same distance as its surround 5.

FIGS. 6 and 7 show various filters that may be used to attempt to create the color motion depth effect. The high selectivity green filter 7 shown in FIG. 6 represents filters that pass at least 20 times more green light than red or blue light. The low selectivity green filter 8 shown in FIG. 6 represents filters that pass up to four times as much green light as red or blue light. The moderate selectivity green filter 9 shown in FIG. 6 represents filters that pass at least four times, but not more than 20 times, as much green light as red or blue light.

The high selectivity magenta filter 10 shown in FIG. 7 represents filters that pass at least 20 times more red and blue light than green light. The low selectivity magenta filter 11 shown in FIG. 7 represents filters that pass up to four times as much red and blue light as green light. The moderate selectivity magenta filter 12 shown in FIG. 7 represents filters that pass at least four times, but not more than 20 times, as much red and blue light as green light.

Combinations of Color Filters. The color motion depth effect system may be used with conventional movie film and/or video systems as well as other systems to create two dimensional images. Viewing filters of different color combinations can be used to take advantage of the colors used in film and video systems. Conventional movie film and video displays (for example standard commercial television, computer displays, video games, etc.) normally use three color systems (red, green and blue). Red normally has a peak transmission of approximately 610 nm and a half-width of approximately 3.5 nm. Green normally has a peak transmission of 540 nm and a half-width of 76 nm. Blue normally has a peak of approximately 435 nm and a half-width of 56 nm.

Nine different combinations of color filters may be used with convention color television and color film to produce the depth effect:

1. Red versus green
2. Red versus blue
3. Green versus blue
4. Magenta (red and blue) versus green
5. Orange (red and green) versus blue
6. Yellow (green and blue) versus red
7. Magenta versus orange
8. Magenta versus yellow
9. Orange versus yellow.

The color combinations 1 (red versus green), 2 (red versus blue), and 3 (green versus blue) take advantage of only two of the three film or video colors. Each eye receives light of mainly one color. This allows for only limited ranges of apparent colors for left eye bright, right eye bright and brightness neutral objects and surrounds.

The color combinations 4 (magenta versus green), 5 (orange versus blue) and 6 (yellow versus red) allow one eye to receive light of any combination of two of the colors. For example any combination of red and blue may be used to create objects and surrounds that are bright to the eye with the magenta filter. Also any combination of red and blue may be balanced against green light to produce neutral brightness objects and surrounds. This allows for a broad range of apparent colors for one eye bright (for example left eye bright), and brightness neutral objects and surrounds. However, only a limited range of apparent colors are available for the other eye bright (for example right eye bright) objects and surrounds.

The color combinations 7 (magenta versus orange), 8 (magenta versus yellow) and 9 (orange versus yellow) allow both eyes to receive the same amount of one color. For example magenta versus orange allows both eyes to receive the same amount of red light. Any amount of the color received by both eyes can be used in combination with a balance of the other two colors to produce neutral brightness objects and surrounds. For example, red can be used alone or with a balanced combination of green and blue to produce neutral brightness objects and surrounds. This allows for a broad range of colors for brightness neutral objects and surrounds. However, only a limited range of apparent colors are available for left eye bright and right eye bright objects and surrounds.

Any one combination of colored filters limits the range of colors for left eye bright or right eye bright objects and surrounds. Different combinations of colored filters can be used for different movies, games, episodes or scenes to expand the usable range of colors for objects and surrounds. Any of the nine combinations of filter colors listed above may be used for different scenes. This allows almost any combination of colored objects and surrounds to be used.

Four Color Systems. The color motion depth effect system may be used with a four color system (for example four color film—red, yellow, green and blue—instead of conventional three color film). The filter for the left eye can attenuate two of the four colors (for example red and green). The filter for the right eye can attenuate the other two colors (for example yellow and blue). This allows each eye to receive two of the four colors. Broad ranges of colors may be used to for left eye bright, right eye bright and brightness neutral objects and surrounds to create the color motion depth effect.

Color Selectivity of Filters. The level of attenuation of a particular color can be varied to produce different effects. For example the selectivity level of a green filter may vary as shown in FIG. 6 from low selectivity 8 through moderate selectivity 9 to high selectivity 7. Likewise a magenta filter may vary as shown in FIG. 7 from low selectivity 11 through moderate selectivity 12 to high selectivity 10.

The lower selectivity filters provide a fuller range of colors with weak to moderate depth effects. Note: Higher rates of lateral movements and more saturated colors also produce stronger depth effects. Filters in the lower end of the moderate color selectivity may be used with objects that have high rates of lateral movement. For example, filters with brightness ratios in the range from 4-to-1 to 8-to-1 may be used with lateral movements over 30 degrees of visual angle per second and/or saturated colors.

Filters in the higher end of the moderate color selectivity range (closer to 20-to-1 brightness ratios than 4-to-1 brightness ratios) produce stronger effects with slower moving and less color saturated objects. However, higher selectivity filters tend to reduce the range of perceived colors. Higher selectivity filters are also more prone to produce the dead eye effect.

Filters of brightness ratios from approximately 8-to-1 to approximately 12-to-1 are generally preferred. This range of brightness ratios produces strong depth effects and good color perception.

Left and right filters of approximately the same level of color selectivity produce comparable depth effects of comparable strength for left eye bright and right eye bright objects and surrounds.

Relative Transmittance of Left and Right Filters. The relative transmittance level of the left and right filters affects the depth perception of color neutral (for example white, gray and black) objects and surrounds. Left and right filters that have the same overall transmittance level are generally preferred. This results in color neutral objects and surrounds being brightness neutral (they appear to be approximately the same brightness to both eyes).

Use of Multiple Object and Color Combinations. The perception of depth can be enhanced by using multiple moving objects and color combinations. The two left eye bright objects 1 in FIG. 2 are moving in opposite lateral directions. The object moving from left to right appears to be closer to the viewer. The object moving from right to left appears to be farther away from the viewer. The two depth effects add together. Therefore the apparent depth between the two objects is as great as the two separate effects.

In a second example, a left eye bright object 1 moving from left to right appears to be nearer to the viewer. Conversely a right eye bright object 2 moving from left to right appears to be farther away from the viewer. A left eye bright object and a bright eye object can both move from left to right together. The left eye bright object appears closer to the viewer. The right eye bright object appears farther away from the viewer. Again the two depth effects add together. Again the apparent depth from the left eye bright object to the right eye bright object is as great as the two separate effects.

Color Saturation of Moving Objects and Surrounds. Generally the more saturated the colors of an object or surround, the greater the eye to eye brightness ratio. Moving objects and surrounds with more saturated colors tend to produce larger eye to eye brightness ratios. Thus objects and surrounds with more saturated colors tend to produce greater depth effects than those with less saturated colors. For example brilliant green is more saturated than light green which is more saturated than pale green. A filter can be used for one eye that passes green light (a green filter). A filter can be used for the other eye that attenuates green light (a magenta filter). In this case, brilliant green will produce a greater depth effect than light green. Likewise, light green will produce a greater effect than pale green.

Complex Objects and Surrounds. The examples given here use simple geometric shapes of uniform color. The color motion depth effect can also be produced with complex colors and surrounds. The combined effect of the amount and saturation of colors in a complex moving object or surround determines if it is left eye bright, brightness neutral, or right eye bright. An object can have both saturated green and saturated red areas. If the saturated green portion is larger than the saturated red portion, the depth effect for the object will be similar to the depth effect for a light green object. If the saturated red portion is larger than the saturated green portion, the depth effect for the object will be similar to the depth effect for a pink (unsaturated red) object.

A moving object may have green and red areas of approximately the same size. In this case the relative saturation of the two colors determines the nature of the depth effect. If the green is more saturated than the red, the depth effect for object will be similar to a light green object. If the red is more saturated than the green, the depth effect for the object will be similar to a pink object.

Apparent Color Shifts. The apparent color of objects is affected by their surrounds. The color of an object tends to be perceived as the complement of the surround color. This effect is especially apparent with light colored objects. For example, a white object will appear to be pink when it has a green surround. A slightly green object will appear white when it has a dark green surround. The apparent color shifts are greater with larger and more saturated adjacent colors. The actual color of objects can be adjusted to produce the desired apparent color when the surrounding areas are colored.

Perceptual Instability. Object and surround colors which appear bright to opposite eyes tend to produce unstable results. The apparent colors and depth effects may alternate back and forth FIG. 5 shows a left eye bright (for example red) object 1 moving from left to right with a right eye bright (for example green) surround 6. FIG. 5 also shows a right eye bright (for example green) object 2 moving from left to right with a left eye bright (for example red) surround 5. In both examples shown in FIG. 5 the object may appear to be either closer to or farther away from the viewer. The depth effect depends upon whether the eye to eye brightness ratio of the object or the eye to eye brightness ratio of the surround dominates. The apparent color of the object itself may alternate between green, red and neutral.

Dead Eye Effect. The Pulfrich effect used in prior art is normally produced by viewing moving objects while one eye is covered by a filter that reduces or attenuates the light. The filter normally attenuates the light by approximately 95% and produces an eye to eye brightness ratio of roughly 20-to-1.

Eye to eye brightness ratios greater than roughly 10-to-1 tend to produce the dead eye effect. The dead eye effect is affected by both the eye to eye brightness ratio and by the amount of the visual field of view that the brightness ratio covers. The dead eye effect tends to be stronger, and more uncomfortable, with higher eye to eye brightness ratios and larger areas of eye to eye brightness ratios. Thus using highly saturated colors that produce eye to eye brightness ratios greater than 20-to-1 increases the dead eye effect without increasing the strength of the depth effect.

The color motion depth effect system reduces (or even eliminates) the "dead eye" effect by balancing or alternating the relative amount of light received by the two eyes. The color motion effect can be produced by using colored moving objects (for example red and green) with brightness neutral (for example gray) surround areas. In this case the overall brightness of the surround is approximately the same for both eyes and the dead eye effect is virtually eliminated.

Colored surrounds tend to produce the dead eye effect since substantially more light is received by one eye than the other. Alternating back and forth between left eye bright (for example red) surrounds and right eye bright (for example green) surrounds reduces the discomfort of the dead eye effect.

Effect of Rate of Movement. The perceived depth of objects (how far away from the viewer they appear) is affected by the rate of lateral movement. A strong effect is produced with lateral movements of approximately 20 to 30 degrees of visual angle per second. (One degree of visual angle equals one inch for an object that is 57 inches away from the viewer.) Slower lateral movements produce less depth effect. Faster lateral movements can be difficult for viewers to follow.

Conclusion

The color motion depth effect system can be used to create the perception of visual depth in two dimensional displays. Objects moving in either lateral direction can be made to appear to be closer to or farther away from the viewer. The depth effect is controlled by the relative left eye to right eye brightness of moving objects and their surrounds. The eye to eye brightness is controlled by:

the colors and selectivity of the viewing lenses, the colors and saturation of the objects and surrounds, and the rate of lateral movement of objects.

The dead eye effect and retinal disparity can be controlled by using viewing filters of moderate color selectivity and by using brightness neutral surrounds.

Many variations and alternate embodiments will occur to those skilled in the art. Accordingly, it is intended that the invention be limited only in terms of the appended claims.

I claim:

1. A method of using colored backgrounds or surrounds of a first group of colors and a second group of colors as part of movie, video or other imagery which when observed through viewer glasses provides visual depth effects for laterally moving objects of brightness neutral colors, the method comprising:

selecting a first group of colors and a second group of colors;

selecting as part of the movie or video imagery surrounds of the first group of colors that cause objects of brightness neutral colors which move from the observer's perspective from left to right to appear to be closer to the observer, and cause objects of brightness neutral colors which move from right to left to appear to be farther from the observer;

selecting as part of the movie and video imagery surrounds of the second group of colors that cause objects of brightness neutral colors which move from right to left to appear to be closer to the observer, and cause objects of brightness neutral colors which move from left to right to appear to be farther from the observer;

selecting as part of the movie and video imagery objects of brightness neutral colors which move laterally; and using viewer glasses comprising a left lens and a right lens wherein the left lens passes from 4 to 20 times as much light of the first group of colors as the right lens, the right lens passes from 4 to 20 times as much light of the second group of colors as the left lens, and the left and right lens of the viewer glasses pass an equivalent amount of light for brightness neutral colors.

2. The method of claim 1 wherein the first group of colors is one of the colors used in conventional movie film and video comprising red with a peak transmission of approximately 610 nm and a half-width of approximately 3.5 nm. and the second group of colors is another of the colors used in conventional movie film and video comprising green with a peak transmission of approximately 540 nm and a half-width of approximately 76 nm.

3. The method of claim 1 wherein the first group of colors is one of the colors used in conventional movie film and video comprising red with a peak transmission of approximately 610 nm and a half-width of approximately 3.5 nm. and the second group of colors is another of the colors used in conventional movie film and video comprising blue with a peak transmission of approximately 435 nm and a half-width of approximately 56 nm.

4. The method of claim 1 wherein the first group of colors is one of the colors used in conventional movie film and video comprising green with a peak transmission of approximately 540 nm and a half-width of approximately 76 nm. and the second group of colors is another of the colors used in conventional movie film and video comprising blue with a peak transmission of approximately 435 nm and a half-width of approximately 56 nm.

5. The method of claim 1 wherein the first group of colors is two of the colors used in conventional movie film and video comprising red with a peak transmission of approximately 610 nm and a half-width of approximately 3.5 nm and blue with a peak transmission of approximately 435 nm and a half-width of approximately 56 nm. and the second group of colors is another of the colors used in conventional movie film and video comprising green with a peak transmission of approximately 540 nm and a half-width of approximately 76 nm.

6. The method of claim 1 wherein the first group of colors is two of the colors used in conventional movie film and video comprising red with a peak transmission of approximately 610 nm and a half-width of approximately 3.5 nm and green with a peak transmission of approximately 540 nm and a half-width of approximately 76 nm. and the second group of colors is another of the colors used in conventional movie film and video comprising blue with a peak transmission of approximately 435 nm and a half-width of approximately 56 nm.

7. The method of claim 1 wherein the first group of colors is two of the colors used in conventional movie film and video comprising green with a peak transmission of approximately 540 nm and a half-width of approximately 76 nm and blue with a peak transmission of approximately 435 nm and a half-width of approximately 56 nm. and the second group of colors is another of the colors used in conventional movie film and video comprising red with a peak transmission of approximately 610 nm and a half-width of approximately 3.5 nm.

8. A method of using objects of a first group of colors and objects of a second group of colors which move laterally against surrounds of brightness neutral colors as part of movie. video or other imagery which when observed through viewer glasses provides visual depth effects. the method comprising:

selecting a first group of colors and a second group of colors;

selecting objects of the first group of colors which move from left to right from the observer's perspective to create the perception of being closer to the observer, and which move from right to left to create the perception of being farther away from the observer;

selecting objects of the second group of colors which move from right to left from the observer's perspective to create the perception of being closer to the observer, and which move from left to right to create the perception of being farther away from the observer;

selecting surrounds of brightness neutral colors; and using viewer glasses comprising a left lens and a right lens wherein the left lens passes from 4 to 20 times as much light of the first group of colors as the right lens, the right lens passes from 4 to 20 times as much light of the second group of colors as the left lens, and the left and right lens of the viewer glasses pass an equivalent amount of light for brightness neutral colors.

9. The method of claim 8 wherein the first group of colors is one of the colors used in conventional movie film and video comprising red with a peak transmission of approximately 610 nm and a half-width of approximately 3.5 nm. and the second group of colors is another of the colors used in conventional movie film and video comprising green with a peak transmission of approximately 540 nm and a half-width of approximately 76 nm.

10. The method of claim 8 wherein the first group of colors is one of the colors used in conventional movie film and video comprising red with a peak transmission of approximately 610 nm and a half-width of approximately 3.5 nm. and the second group of colors is another of the colors used in conventional movie film and video comprising blue with a peak transmission of approximately 435 nm and a half-width of approximately 56 nm.

11. The method of claim 8 wherein the first group of colors is one of the colors used in conventional movie film and video comprising green with a peak transmission of approximately 540 nm and a half-width of approximately 76 nm. and the second group of colors is another of the colors used in conventional movie film and video comprising blue with a peak transmission of approximately 435 nm and a half-width of approximately 56 nm.

12. The method of claim 8 wherein the first group of colors is two of the colors used in conventional movie film and video comprising red with a peak transmission of approximately 610 nm and a half-width of approximately 3.5 nm and blue with a peak transmission of approximately 435 nm and a half-width of approximately 56 nm. and the second group of colors is another of the colors used in conventional movie film and video comprising green with a peak transmission of approximately 540 nm and a half-width of approximately 76 nm.

13. The method of claim 8 wherein the first group of colors is two of the colors used in conventional movie film and video comprising red with a peak transmission of approximately 610 nm and a half-width of approximately 3.5 nm and green with a peak transmission of approximately 540 nm and a half-width of approximately 76 nm. and the second group of colors is another of the colors used in conventional movie film and video comprising blue with a peak transmission of approximately 435 nm and a half-width of approximately 56 nm.

14. The method of claim 8 wherein the first group of colors is two of the colors used in conventional movie film and video comprising green with a peak transmission of approximately 540 nm and a half-width of approximately 76 nm and blue with a peak transmission of approximately 435 nm and a half-width of approximately 56 nm. and the second group of colors is another of the colors used in conventional movie film and video comprising red with a peak transmission of approximately 610 nm and a half-width of approximately 3.5.

15. A method of using surrounds and laterally moving objects of a first group of colors and surrounds and laterally moving objects of a second group of colors as part of movie, video or other imagery which when observed through viewer glasses provides visual depth effects for the laterally moving objects, the method comprising:

- selecting a first group of colors and a second group of colors;
- selecting surrounds of the first group of colors that cause objects which move from the observer's perspective from left to right to appear to be closer to the observer, and cause objects which move from right to left to appear to be farther from the observer;
- depicting laterally moving objects of the first group of colors which move from left to right to create the perception of being closer to the observer, and which move from right to left to create the perception of being farther away from the observer;
- selecting surrounds of the second group of colors that cause objects which move from right to left to appear to be closer to the observer, and cause objects of which move from left to right to appear to be farther from the observer;
- depicting objects of the second group of colors which move from right to left to create the perception of being closer to the observer, and which move from left to right to create the perception of being farther away from the observer;
- using viewer glasses comprising a left lens and a right lens wherein the left lens passes from 4 to 20 times as much light of the first group of colors as the right lens, the right lens passes from 4 to 20 times as much light of the second group of colors as the left lens.

16. The method of claim 15 wherein laterally moving objects of the first group of colors are set against surrounds of the first group of colors and laterally moving objects of the second group of colors are set against surrounds of the second group of colors provides additive visual depth effects.

17. The method of claim 15 wherein laterally moving objects of the first group of colors are set against surrounds of the second group of colors and laterally moving objects of the second group of colors are set against surrounds of the first group of colors provides opposing visual effects that create instability of perceived depth and color.

18. The method of claim 15 wherein the first group of colors is one of the colors used in conventional movie film and video comprising red with a peak transmission of approximately 610 nm and a half-width of approximately 3.5 nm, and the second group of colors is another of the colors used in conventional movie film and video comprising green with a peak transmission of approximately 540 nm and a half-width of approximately 76 nm.

19. The method of claim 15 wherein the first group of colors is one of the colors used in conventional movie film and video comprising red with a peak transmission of approximately 610 nm and a half-width of approximately 3.5 nm, and the second group of colors is another of the colors used in conventional movie film and video comprising blue with a peak transmission of approximately 435 nm and a half-width of approximately 56 nm.

20. The method of claim 15 wherein the first group of colors is one of the colors used in conventional movie film and video comprising green with a peak transmission of approximately 540 nm and a half-width of approximately 76 nm, and the second group of colors is another of the colors used in conventional movie film and video comprising blue with a peak transmission of approximately 435 nm and a half-width of approximately 56 nm.

21. The method of claim 15 wherein the first group of colors is two of the colors used in conventional movie film and video comprising red with a peak transmission of approximately 610 nm and a half-width of approximately 3.5 nm and blue with a peak transmission of approximately 435 nm and a half-width of approximately 56 nm, and the second group of colors is another of the colors used in conventional movie film and video comprising green with a peak transmission of approximately 540 nm and a half-width of approximately 76 nm.

22. The method of claim 15 wherein the first group of colors is two of the colors used in conventional movie film and video comprising red with a peak transmission of approximately 610 nm and a half-width of approximately 3.5 nm and green with a peak transmission of approximately 540 nm and a half-width of approximately 76 nm, and the second group of colors is another of the colors used in conventional movie film and video comprising blue with a peak transmission of approximately 435 nm and a half-width of approximately 56 nm.

23. The method of claim 15 wherein the first group of colors is two of the colors used in conventional movie film and video comprising green with a peak transmission of approximately 540 nm and a half-width of approximately 76 nm and blue with a peak transmission of approximately 435 nm and a half-width of approximately 56 nm, and the second group of colors is another of the colors used in conventional movie film and video comprising red with a peak transmission of approximately 610 nm and a half-width of approximately 3.5 nm.

24. The method of claim 15 wherein said surrounds of the first group of colors and said laterally moving objects of the first group of colors differ in brightness, and said surrounds of the second group of colors and said laterally moving objects of the second group of colors differ in brightness.

25. The method of claim 15 wherein said surrounds of the first group of colors and said laterally moving objects of the first group of colors differ in color saturation, and said surrounds of said second group of colors and said laterally moving objects of the second group of colors differ in color saturation.

* * * * *